(12) United States Patent
Lee et al.

(10) Patent No.: US 7,917,022 B2  
(45) Date of Patent: Mar. 29, 2011

(54) SHAKING SENSING AND CORRECTION APPARATUS AND METHOD

(75) Inventors: Jin-gi Lee, Changwon (KR); Sung Park, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 12/410,570

(22) Filed: Mar. 25, 2009

(65) Prior Publication Data

US 2009/0245772 A1 Oct. 1, 2009

(30) Foreign Application Priority Data

Mar. 31, 2008 (KR) .................. 10-2008-0029848

(51) Int. Cl.  
*G03B 17/00* (2006.01)  
*H04N 5/228* (2006.01)

(52) U.S. Cl. ........ 396/55; 396/53; 348/208.2; 348/208.7

(58) Field of Classification Search ............ 396/55, 396/52, 53; 348/208.99, 208.1, 208.2, 208.4, 348/208.5, 208.7, 208.11; 359/554, 557  
See application file for complete search history.

(56) References Cited

U.S. PATENT DOCUMENTS

| | | | |
|---|---|---|---|
| 4,965,619 A | 10/1990 | Shikaumi et al. | |
| 5,245,378 A | 9/1993 | Washisu | |
| 5,266,981 A | 11/1993 | Hamada et al. | |
| 5,337,098 A | 8/1994 | Imafuji et al. | |
| 5,459,542 A | 10/1995 | Fujiwara et al. | |
| 5,479,236 A | 12/1995 | Tanaka | |
| 5,561,485 A | 10/1996 | Hamada et al. | |
| 5,721,968 A | 2/1998 | Iwane et al. | |
| 6,064,826 A | 5/2000 | Washisu | |
| 6,067,419 A | 5/2000 | Shiomi | |
| 6,332,060 B1 | 12/2001 | Miyamoto et al. | |
| 6,393,215 B1 * | 5/2002 | Washisu .................. 396/52 |

* cited by examiner

*Primary Examiner* — Rochelle-Ann J Blackman  
(74) *Attorney, Agent, or Firm* — Drinker Biddle & Reath LLP

(57) ABSTRACT

A shaking sensing unit includes a sensor sensing a rotation about at least one axis, a high pass filter passing only a signal having a frequency not less than a cutoff frequency of the high pass filter, among electrical signals output from the sensor, and a low pass filter passing only a signal having a frequency not greater than a cutoff frequency of the low pass filter and higher than the cutoff frequency of the high pass filter, among the electrical signals output from the sensor. The cutoff frequency of the high pass filter and the cutoff frequency of the low pass filter are variably determined according to a shaking frequency.

20 Claims, 11 Drawing Sheets

(WHEN TR$_{HPFY1}$ IS TURNED ON)

(WHEN TR$_{HPFY1}$ IS TURNED OFF)

SHAKING SENSING AND CORRECTION APPARATUS AND METHOD

CROSS-REFERENCE TO RELATED PATENT APPLICATIONS

This application claims the benefit of Korean Patent Application No. 10-2008-0029848, filed on Mar. 31, 2008, in the Korean Intellectual Property Office, the disclosure of which is incorporated herein in its entirety by reference.

BACKGROUND OF THE INVENTION

1. Field of the Invention

The present invention relates to a shaking sensing unit, an apparatus for correcting shaking comprising the shaking sensing unit, and a method of correcting shaking, and more particularly, to a shaking sensing unit which can accurately correct shaking occurring due to hand shaking of a user in a photographing device such as a still camera or a video camera, an apparatus for correcting shaking comprising the shaking sensing unit, and a method of correcting shaking.

2. Description of the Related Art

When a photographing device is shaken due to hand shaking by a user during photography, images are not clearly photographed. A shaking correction apparatus can correct the shaking of the photographing device, and thus clear images can be obtained.

Conventional shaking correction apparatuses adopt either a method of optically correcting shaking or a method of correcting shaking using software. The optical correction method is divided into a method of correcting an image by moving lenses to offset the shaking of the photographing device and a method of correcting by moving an image sensor to offset the shaking of the photographing device.

In the software correction method, images are processed using software. For example, in a shaking correction mode, an image is photographed several times for a predetermined time and only an image with the least motion blur is processed and stored, or an image is photographed several times, brightness information and image information are respectively extracted, and an image with the least motion blur is stored.

However, in a photographing device adopting the shaking correction method, particularly, the optical correction method, only shaking having a frequency range between 4-15 Hz is set to be corrected due to a technical limit in extending a shaking correction range. Thus, it is difficult to correct shaking having a frequency outside the range of 4-15 Hz.

In detail, when the photographing device is fixed on a tripod or any other similar device (a mechanism for fixing a photographing device), the shaking correction apparatus in a shaking correction mode keeps a lens located at the center thereof during the photography. However, since a tripod is usually made of a highly rigid material such as aluminum, the tripod is not able to absorb an external impact or vibration, and rather it transfers or amplifies the external impact or vibration. In the meantime, it is known that the frequency of hand shaking of a user holding the photographing device is generally 4-15 Hz.

Thus, when the photographing device is fixed on a tripod or the photographer is transported in a vehicle, the external impact or vibration delivered to the photographing device, that is, fine shaking due to the shaking of the tripod itself or excessive vibration due to the vehicle, may be lower than 4 Hz or higher than 15 Hz, that is, outside the range of frequency of the hand shaking. In this case, when an image is photographed using a conventional photographing device in the shaking correction mode, a shaking sensing sensor included in the photographing device senses the impact and vibration and reacts thereto. However, the reaction, that is, correction, by the shaking sensing sensor is performed outside the frequency range of natural human shaking so that a mistake in correction, for example, over-correction is performed. As a result, the mistake in correction produces a more unclear image. That is, since the shaking correction apparatus over-reacts to the fine shaking transferred to the photographing device, it is difficult to obtain a clearer image than in a normal mode that is not the shaking correction mode.

SUMMARY OF THE INVENTION

The present invention provides, in its several variations or embodiments, a shaking sensing unit which can properly correct shaking having a frequency outside a general frequency range of the shaking, an apparatus for correcting shaking comprising the shaking sensing unit, and a method of correcting shaking.

According to an aspect of the present invention, a shaking sensing unit comprises at least one sensor for sensing a rotation about at least one axis, a filter circuit comprising a high pass filter and a low pass filter. The high pass filter passes only a signal having a frequency not less than a cutoff frequency of the high pass filter. The low pass filter passes only a signal having a frequency not greater than a cutoff frequency of the low pass filter and higher than the cutoff frequency of the high pass filter. And the cutoff frequency of the high pass filter and the cutoff frequency of the low pass filter are variably determined according to a shaking frequency. The at least one sensor supplies a sensor signal to the filter circuit.

In an embodiment the at least one sensor comprises two sensors, one for each of two substantially orthogonal axes of rotation. In other embodiments, three sensors or one sensor may be used.

The high pass filter comprises at least one capacitor, at least two resistors connected in parallel to each other and connected to the at least one capacitor to pass only a signal having a frequency not less than the cutoff frequency of the high pass filter, and at least one switching device serially connected to at least one of the at least two resistors, wherein the switching device connects or disconnects a circuit line of the resistor serially connected to the at least one switching device according to a switching control signal, thereby controlling the overall equivalent resistance of the at least two resistors. Thus, the cutoff frequency of the high pass filter can be variable. The high pass filter further comprises at least one inductor connected to the at least one capacitor and the at least two resistors to pass only a signal having a frequency not less than the cutoff frequency of the high pass filter.

The low pass filter comprises at least one capacitor, at least two resistors connected in parallel to each other and connected to the least one capacitor to pass only a signal having a frequency not greater than the cutoff frequency of the low pass filter, and at least one switching device serially connected to at least one of the at least two resistors, wherein the at least one switching device connects or disconnects a circuit line of the resistor serially connected to the at least one switching device according to a switching control signal, thereby controlling the overall equivalent resistance of the at least two resistors. Thus, the cutoff frequency of the low pass filter can be variable.

The low pass filter comprises at least one inductor, at least two resistors connected in parallel to each other and connected to the least one inductor to pass only a signal having a frequency not greater than the cutoff frequency of the low pass filter, and at least one switching device serially connected to at least one of the at least two resistors, wherein the at least one switching device connects or disconnects a circuit line of the resistor serially connected to the at least one switching device according to a switching control signal, thereby controlling the overall equivalent resistance of the at least two resistors. Thus, the cutoff frequency of the low pass filter can be variable. The low pass filter further comprises at least one capacitor connected to the at least one inductor and the at least two resistors to pass only a signal having a frequency not greater than the cutoff frequency of the low pass filter.

The at least one switching device comprises a transistor and a circuit line of the resistor serially connected to the at least one switching device is connected or disconnected according to a switching control signal input to a base terminal of the transistor. The at least one switching device comprises a silicon controlled rectifier (SCR) and a circuit line of the resistor serially connected to the at least one switching device is connected or disconnected according to a switching control signal input to a gate terminal of the silicon controlled rectifier.

The shaking sensing unit further comprises an amplification unit which receives an electrical signal output from the high pass filter and the low pass filter and generates an amplified electrical signal. The shaking sensing unit further comprises a DC power source which is connected to the high pass filter or the low pass filter and supplies a bias signal to an electrical signal input to the amplification unit.

According to another aspect of the present invention, an apparatus for correcting shaking, the apparatus comprises the shaking sensing unit, a shaking control unit receiving a shaking signal output from the shaking sensing unit, determining a cutoff frequency range of correction of shaking, calculating an amount of correction of shaking, and outputting a driving signal, and a shaking correcting unit being driven according to the driving signal.

According to another aspect of the present invention, a method of correcting shaking comprises determining a shaking correction frequency range by processing an electrical signal output from a sensor sensing a rotation about at least one axis, resetting a cutoff frequency of each of a high pass filter and a low pass filter connected to a rear portion of an output node of the sensor to correspond to the determined shaking correction frequency range, allowing the electrical signal output from the sensor to pass through the high pass filter having the reset cutoff frequency and the low pass filter having the reset cutoff frequency, and determining an amount of correction of shaking in at least one axis using the electrical signals output from the high pass filter and the low pass filter.

The method further comprises inputting the electrical signals output from the high pass filter and the low pass filter to an amplification unit, wherein, in the determining of an amount of correction of shaking, the amount of correction of shaking in the at least one axis is determined using the electrical signal output from the amplification unit.

The determining of a shaking correction frequency range comprises setting an initial cutoff frequency of the high pass filter to be lower than a preset reference cutoff frequency of the high pass filter for a preset typical hand shaking case, and determining whether the percentage of signals having a frequency that is lower than the reference cutoff frequency at an output node of the high pass filter among a plurality of signals output from the sensor, is not less than a reference threshold, wherein, if the percentage of signals having a frequency that is lower than the reference cutoff frequency at the output node of the high pass filter among a plurality of signals output from the sensor, is determined to be not less than a reference threshold, the shaking correction frequency range is reset to a low frequency shaking correction frequency range that is lower than the shaking correction frequency range for the typical hand shaking case, and if the percentage of signals having a frequency that is lower than the reference cutoff frequency at the output node of the high pass filter among the signals output from the sensor, is determined to be not greater than the reference threshold, the shaking correction frequency range is rest to the shaking correction frequency range for the typical hand shaking case.

The determining of a shaking correction frequency range comprises setting an initial cutoff frequency of the low pass filter to be higher than a reference cutoff frequency of the low pass filter for a preset typical hand shaking case, and determining whether the percentage of signals having a frequency that is higher than the reference cutoff frequency at an output node of the low pass filter among a plurality of signals output from the sensor, is not less than a reference threshold, wherein, if the percentage of signals having a frequency that is higher than the reference cutoff frequency at the output node of the low pass filter among a plurality of signals output from the sensor, is determined to be not less than a reference threshold, the shaking correction frequency range is reset to a high frequency shaking correction frequency range that is higher than the shaking correction frequency range for the typical hand shaking case, and if the percentage of signals having a frequency that exceeds the reference cutoff frequency at the output node of the low pass filter among the signals output from the sensor, is determined to be not greater than the reference threshold, the shaking correction frequency range is rest to the shaking correction frequency range for the typical hand shaking case.

The shaking correction frequency range for the typical hand shaking case is about 4-15 Hz, the low frequency shaking correction frequency range is about 0.01-8 Hz, and the high frequency shaking correction frequency range is about 8-20 Hz.

In the resetting of the cutoff frequency of each of the high pass filter and the low pass filter, a lower limit of the set shaking correction frequency range is set as the cutoff frequency of the high pass filter and an upper limit of the set shaking correction frequency range is set as the cutoff frequency of the low pass filter.

In the resetting of the cutoff frequency of each of the high pass filter and the low pass filter, the cut off frequencies in each of the high pass filter and the low pass filter is reset by using a switching device of each of the high pass filter and the low pass filter and adjusting the overall equivalent resistance of at least two resistors in each of the high pass filter and the low pass filter. However, the protection scope of the present invention is not limited thereto. The use of electrical devices which can change the equivalent resistance value of each filter into at least two steps without using the switching device may belong to the protection scope of the present invention.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
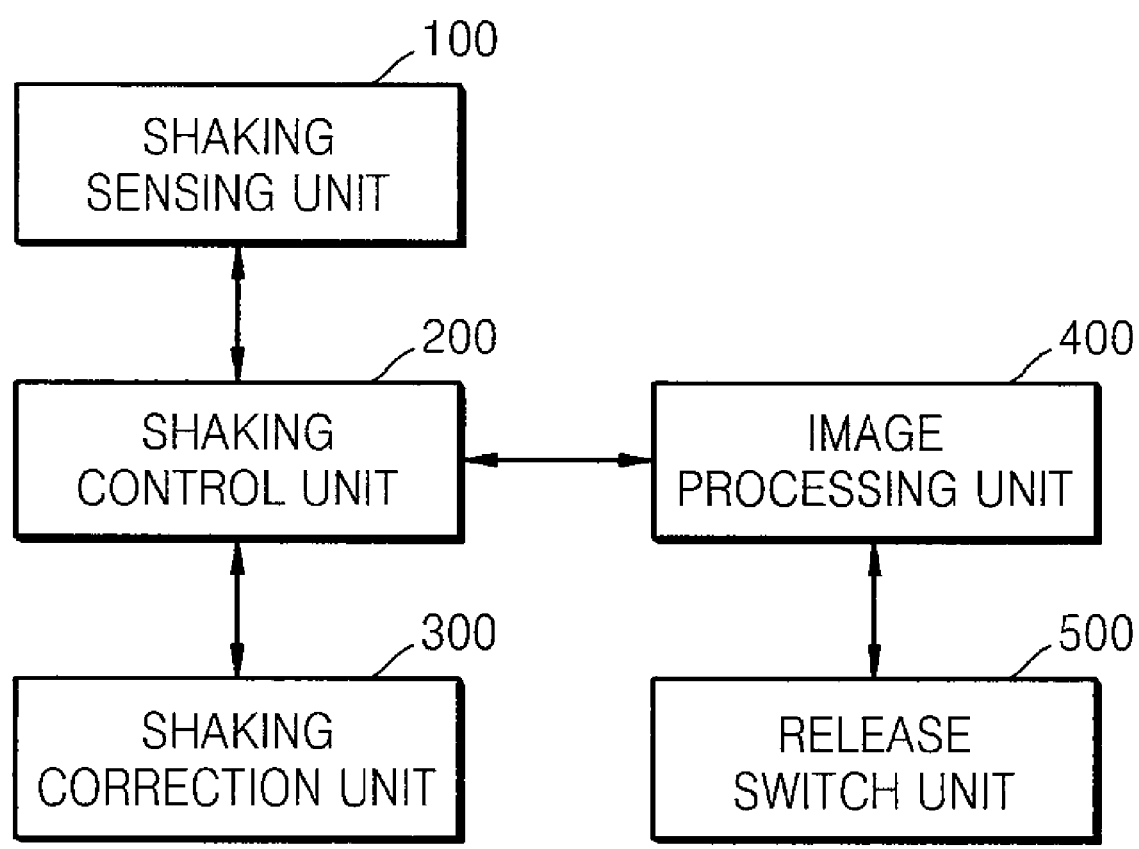
FIG. 1 is a block diagram showing the configuration of an apparatus for correcting shaking, according to an embodiment of the present invention.

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

FIG. 1 is a block diagram showing the configuration of an apparatus for correcting shaking, according to an embodiment of the present invention. Referring to FIG. 1, the apparatus for correcting shaking according to the current embodiment of the present invention includes a shaking sensing unit 100, a shaking control unit 200, a shaking correction unit 300, an image processing unit 400, and a release switch unit 500. The shaking sensing unit 100 senses shaking including hand shaking delivered to a photographing device. The shaking control unit 200 analyzes a shaking signal output from the shaking sensing unit 100, determines whether the photographing device photographing an image is held by the hands of a user or is mounted on a tripod, calculates a shaking correction amount needed for correction of the shaking, and controls the driving of the shaking correction unit 300. The shaking correction unit 300 corrects the shaking by driving a correction lens or a photographing device as much as the shaking correction amount in response to a driving signal output from the shaking control unit 200. The image processing unit 400 performs image photographing. The release switch unit 500 provides a signal indicating the start of the image photographing.

Figure 2:
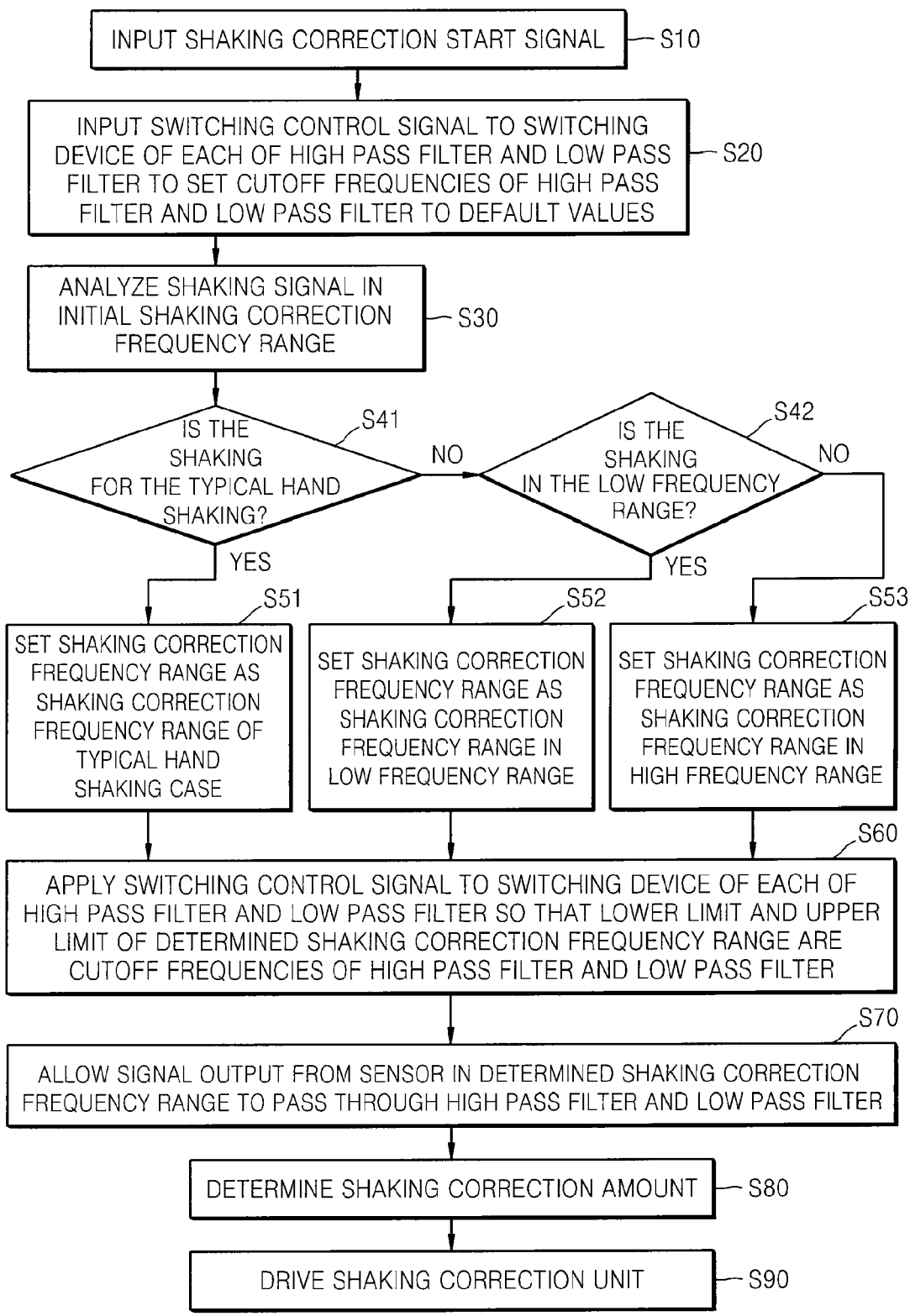
FIG. 2 is a flowchart showing a method of correcting shaking, according to an embodiment of the present invention.

FIG. 2 is a flowchart showing a method of correcting shaking using the apparatus for correcting shaking of FIG. 1, according to an embodiment of the present invention. Referring to FIG. 2, when a shaking correction start signal is input (S10), cutoff frequencies of a high pass filter HPF and a low pass filter LPF included in the shaking sensing unit 100 are set using default values (S20). The shaking correction start signal may be generated through various events. For example, the shaking correction start signal can be generated by pressing a release switch or by pressing the release switch when a shaking correction mode is selected.

For a typical hand shaking case, a shaking correction frequency range is generally between 4-15 Hz (that is, shaking having a frequency range of 4-15 Hz is corrected). In the present embodiment, not only typical hand shaking but also shaking in a low frequency range is corrected. The initial shaking correction frequency range of sensing a shaking signal at the initial correction stage may be 0.01-15 Hz (in one embodiment, 0.03-15 Hz). In this case, the default value of the cutoff frequency of the high pass filter is 0.01 Hz (in one embodiment, 0.03 Hz) that is lower than the 4 Hz cutoff frequency of the high pass filter for the shaking correction frequency range of the typical hand shaking case. As stated above, by setting the initial shaking correction frequency range to be wider than that of the shaking correction frequency range of the typical hand shaking case to include a low frequency portion, it can be determined whether the photographing device is supported on a tripod and shaking is generated in the lower frequency range or shaking is generated due to the typical hand shaking. Accordingly, shaking correction can be performed in an appropriate shaking correction frequency range.

In another embodiment of the present invention, not only typical hand shaking but also shaking in a high frequency range is corrected. In this embodiment, the initial shaking correction frequency range may be a high frequency range of 4 Hz-2 kHz. The default value of the cutoff frequency of the low pass filter in this case is 2 kHz, which is higher than the 15 Hz cutoff frequency of the low pass filter for the shaking correction frequency range of the typical hand shaking case. As above, by setting the initial shaking correction frequency range to be wider than that of the shaking correction frequency range of the typical hand shaking case to include a high frequency portion, it can be determined whether the shaking is typical hand shaking or shaking in a high frequency range generated due to mechanical vibrations. Accordingly, shaking correction can be performed in an appropriate shaking correction frequency range.

In yet another embodiment of the present invention, not only typical hand shaking but also shaking in either a low or a high frequency range is corrected. The initial shaking correction frequency range may be 0.01 Hz-2 kHz (in one embodiment, 0.03 Hz-2 kHz). The default value of the cutoff frequency of the high pass filter in this embodiment is 0.01 Hz (but, in another embodiment, is 0.03 Hz), which is lower than the 4 Hz cutoff frequency of the high pass filter for the shaking correction frequency range of the typical hand shaking case. Also, the default value of the cutoff frequency of the low pass filter is 2 kHz, which is higher than the 15 Hz cutoff frequency of the low pass filter for the shaking correction frequency range of the typical hand shaking case. As stated above, by setting the initial shaking correction frequency range to be respectively wider than that of the shaking correction frequency range of the typical hand shaking case to include a low frequency portion and a high frequency portion, it can be determined whether the shaking is typical hand shaking, the shaking is in a lower frequency range as the photographing device is supported on a tripod, or the shaking is in a high frequency range generated due to mechanical vibrations. Accordingly, shaking correction can be performed in an appropriate shaking correction frequency range.

The cutoff frequencies of the high pass filter and the low pass filter can be set to the default values by inputting a switching control signal, for example, a high or low signal, to a switching device of each of the high pass filter and the low pass filter, for example, a transistor TR or a silicon controlled rectifier SCR. The description of the setting method will be described later in detail with reference to FIG. 3.

In each of the embodiments described above, shaking signals output from a sensor (not shown in FIG. 3) are analyzed (S30) initially with the cutoff frequencies of the high pass filter and the low pass filter set to default values. Thus, in the first embodiment described above, according to the analysis of the shaking signals sensed by the sensor, it is determined whether the shaking is a typical hand shaking or the shaking is in a lower frequency range as the photographing device is supported on a tripod (S41). In the second embodiment, according to the analysis of the shaking signals sensed by the sensor, it is determined whether the shaking is typical hand shaking or the shaking is in a high frequency range generated due to mechanical vibrations (S42). In the third embodiment, according to the analysis of the shaking signals sensed by the sensor, it is determined whether the shaking is a typical hand shaking, the shaking is one in a lower frequency range as the photographing device is supported on a tripod, or the shaking is one in a high frequency range generated due to mechanical vibrations.

The determination can be performed as follows. In the first embodiment, when the percentage of signals having a frequency lower than a reference cutoff frequency that is a cutoff frequency of the high pass filter for the typical hand shaking case, for example, 4 Hz, among the signals output from an output port of the high pass filter is greater than a reference threshold, for example, 50%, the current shaking is determined to be shaking in a low frequency range. On the other hand, when the percentage of signals is not greater than the reference threshold, for example, 50%, the current shaking is determined to be the typical hand shaking.

In the second embodiment, when the percentage of signals having a frequency higher than a reference cutoff frequency that is a cutoff frequency of the low pass filter for the typical hand shaking case, for example, 15 Hz, among the signals output from an output port of the low pass filter is greater than a reference threshold, for example, 50%, the current shaking is determined to be shaking in a high frequency range. On the other hand, when the percentage of signals is not greater than the reference threshold, for example, 50%, the current shaking is determined to be the typical hand shaking.

In the third embodiment, when the percentage of signals having a frequency lower than a reference cutoff frequency that is a cutoff frequency of the high pass filter for the typical hand shaking case, for example, 4 Hz, among the signals output from an output port of the high pass filter is greater than a reference threshold, for example, 50%, the current shaking is determined to be in a low frequency range. Also, when the percentage of signals having a frequency higher than a reference cutoff frequency that is a cutoff frequency of the low pass filter for the typical hand shaking case, for example, 15 Hz, among the signals output from an output port of the (low pass filter is greater than a reference threshold, for example, 50%, the current shaking is determined to be shaking in a high frequency range. On the other hand, when the percentage of signals in a range between 4-15 Hz among the signals output from the output port of the high pass filter is greater than the reference threshold, for example, 50%, the current shaking is determined to be the typical hand shaking.

In each embodiment, when the shaking is determined to be the typical hand shaking, the shaking correction frequency range is set as the shaking correction frequency range of the typical hand shaking, that is, 4-15 Hz in the present embodiment (S51). When the shaking is determined to be shaking in a low frequency range, the shaking correction frequency range is set as the shaking correction frequency range in the low frequency range, that is, 0.03-8 Hz in the present embodiment (S52). When the shaking is determined to be shaking in a high frequency range, the shaking correction frequency range is set as the shaking correction frequency range in the high frequency range, that is, 8-20 Hz in the present embodiment (S53).

In each embodiment, when the shaking correction frequency range is determined as described above, the cutoff frequencies of the high pass filter and the low pass filter are reset. The cutoff frequency of the high pass filter is a lower limit of the shaking correction frequency range and the cutoff frequency of the low pass filter is an upper limit of the shaking correction frequency range (S60).

In the first embodiment, for example, when the shaking is determined to be the typical hand shaking, since the shaking correction frequency range is 4-15 Hz, the cutoff frequency of the high pass filter is reset from 0.03 Hz to about 4 Hz. However, since the default value of the cutoff frequency of the low pass filter is 15 Hz, there is no need to reset the default value of the cutoff frequency of the low pass filter. When the shaking is determined to be shaking in a low frequency range, since the shaking correction frequency range is 0.03-8 Hz, the cutoff frequency of the low pass filter is reset from 15 Hz to about 8 Hz. However, since the default value of the cutoff frequency of the high pass filter is about 0.03 Hz, there is no need to reset the default value of the cutoff frequency of the high pass filter.

In the second embodiment, for example, when the shaking is determined to be the typical hand shaking, since the shaking correction frequency range is 4-15 Hz, the cutoff frequency of the low pass filter is reset from 2 kHz to about 15 Hz. However, since the default value of the cutoff frequency of the high pass filter is 4 Hz, there is no need to reset the default value. When the shaking is determined to be one in a high frequency range, since the shaking correction frequency range is 8-20 Hz, the cutoff frequency of the high pass filter is reset from 4 Hz to about 8 Hz and the cutoff frequency of the low pass filter is reset from 2 kHz to about 20 Hz.

In the third embodiment, for example, when the shaking is determined to be the typical hand shaking, since the shaking correction frequency range is 4-15 Hz, the cutoff frequency of the high pass filter is reset from 0.03 Hz to about 4 Hz and the cutoff frequency of the low pass filter is reset from 2 kHz to about 15 Hz. When the shaking is determined to be shaking in a low frequency range, since the shaking correction frequency range is 0.03-8 Hz, the cutoff frequency of the low pass filter is reset from 2 kHz to about 8 Hz. However, since the default value of the cutoff frequency of the high pass filter is about 0.03 Hz, there is no need to reset the default value of the cutoff frequency of the high pass filter. When the shaking is determined to be shaking in a high frequency range, since the shaking correction frequency range is 8-20 Hz, the cutoff frequency of the high pass filter is reset from 0.03 Hz to about 8 Hz and the cutoff frequency of the low pass filter is reset from 2 kHz to about 20 Hz.

The cutoff frequencies of the high pass filter and the low pass filter can be reset by inputting the switching control signal that is either "high" or "low" to the switching device, for example, a transistor or a silicon controlled rectifier in each filter circuit. This will be described in detail later with reference to FIG. 3.

Figure 5:
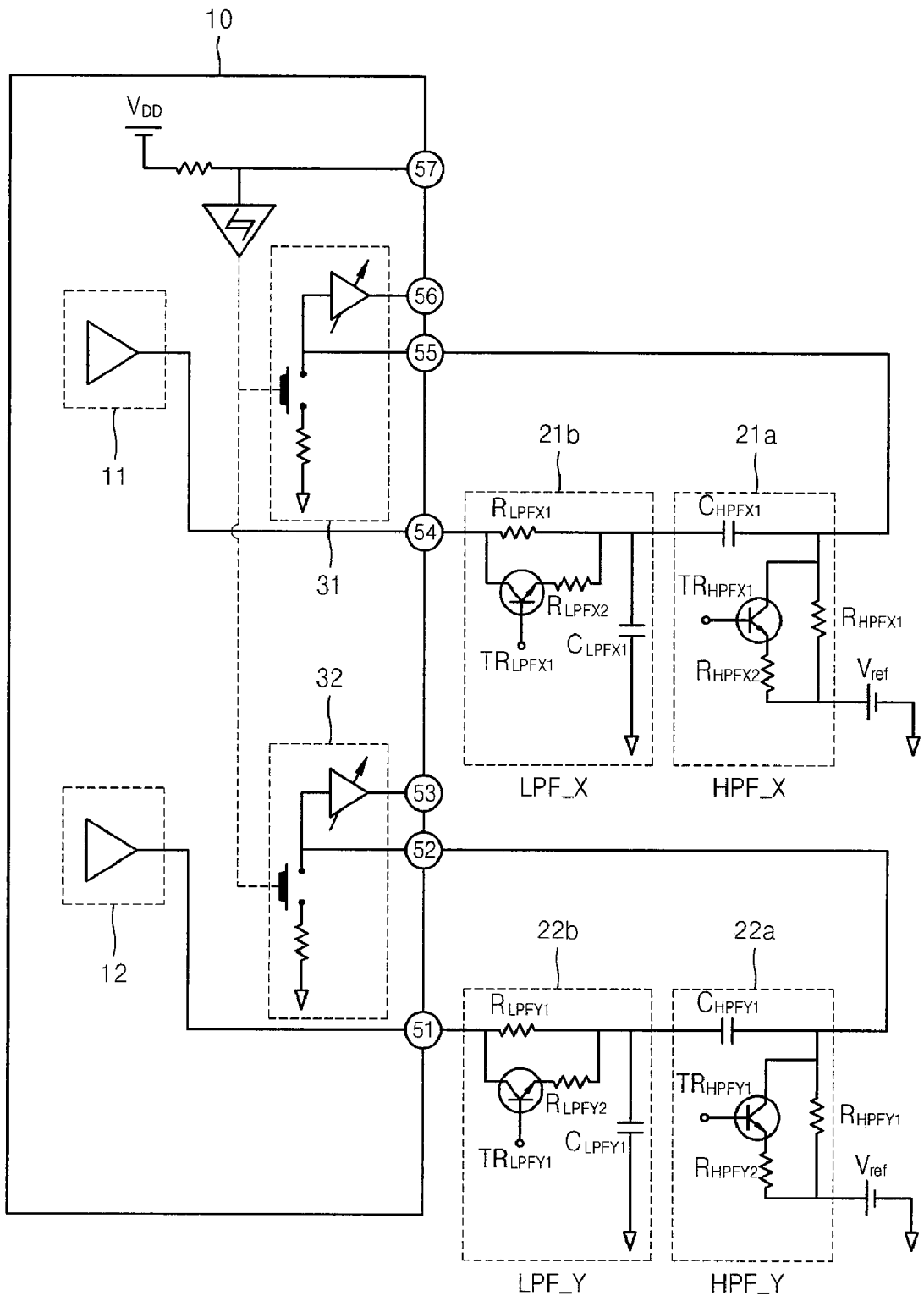
FIG. 5 is a circuit diagram of the shaking sensing unit of FIG. 3, according to another embodiment of the present invention.

After the cutoff frequencies of the high pass filter and the low pass filter are reset to correspond to the shaking correction frequency range, a signal is generated at the output port of the shaking sensing unit 100 by allowing the signal output from the sensor to pass through the high pass filter and the low pass filter (S70). If necessary, the signal passing through the filters may be amplified appropriately. Also, as shown in FIG. 5, the circuit may be configured such that the signal output from the sensor passes the low pass filter and then the high pass filter.

A signal output from the shaking sensing unit 100 is input to the shaking control unit 200 and the shaking control unit 200 determines a shaking correction amount based on the output signal of the shaking sensing unit 100 (S80). The shaking control unit 200 determines the driving amount of the shaking correction unit 300 with respect to an X axis and a Y axis based on the shaking correction amount determined with respect to the X axis and the Y axis and transmits a driving control signal to the shaking correction unit 300. The shaking correction unit 300 receiving the drive control signal moves lenses or an image sensor, for example, a CCD or CMOS, of the photographing device to correct the shaking of the photographing device (S90).

The descriptions about the shaking signal sensing, the shaking frequency range determination, the shaking correction amount determination, and the shaking correction unit 300 driving are for each of the X axis and the Y axis. As described above, in the first embodiment, the current shaking state is determined as the typical hand shaking case or the shaking in a low frequency range, according to the previously sensed shaking signal. In the second embodiment, the current shaking state is determined as the typical hand shaking case or the shaking in a high frequency range, according to the previously sensed shaking signal. In the third embodiment, the current shaking state is determined as the typical hand shaking case, the shaking in a low frequency range, or the shaking in a high frequency range, according to the previously sensed shaking signal.

In each embodiment, the shaking correction frequency range is set and the shaking correction unit 300 is driven only in the set shaking correction frequency range to perform the shaking correction. That is, when the shaking is determined to be shaking having a frequency outside the typical hand shaking correction range, the shaking correction frequency range is changed to a corresponding shaking frequency correction range and the shaking correction is performed. Thus, the correction can be accurately performed even in a shaking environment having a frequency outside the typical hand shaking correction range.

Figure 3:
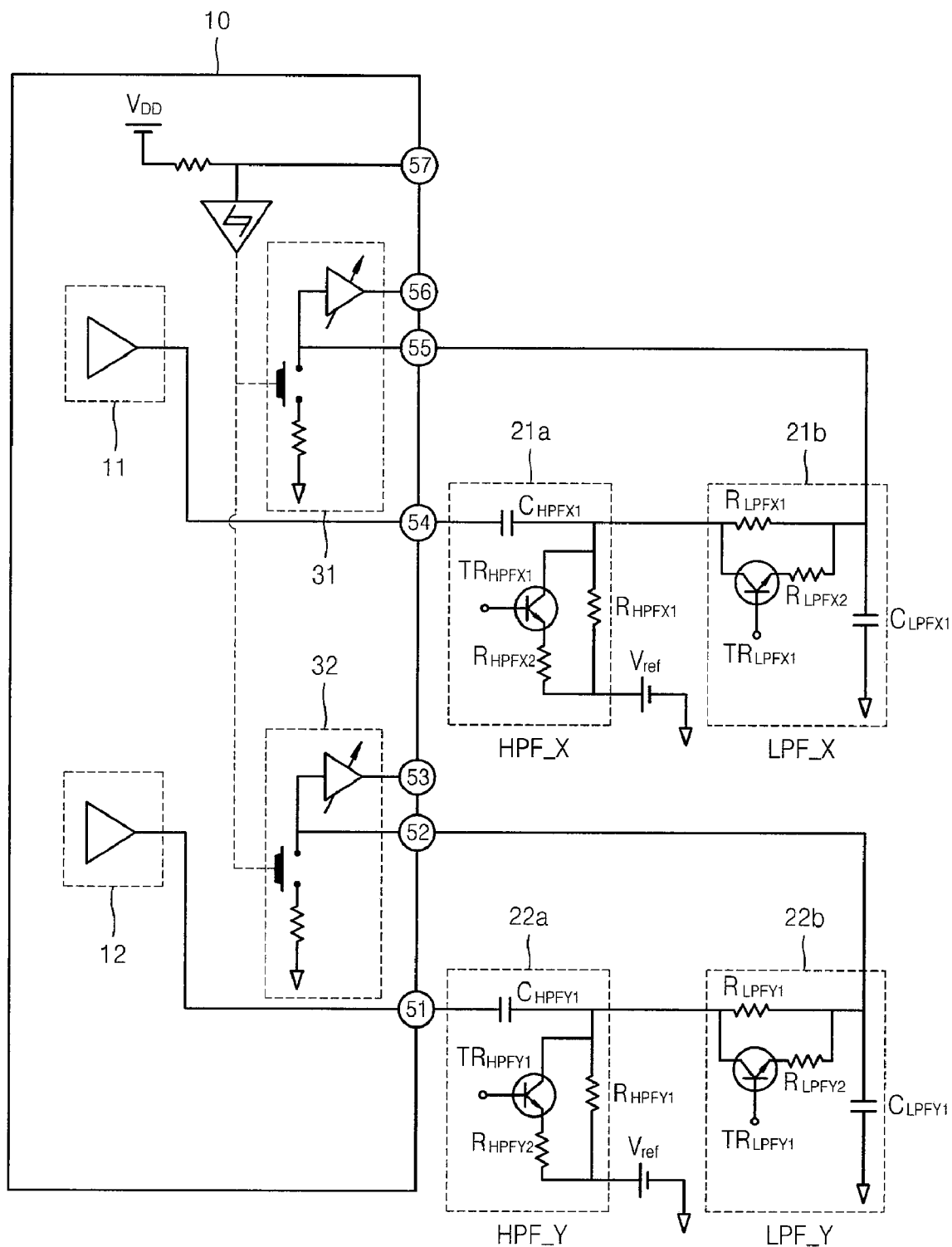
FIG. 3 is a circuit diagram of a shaking sensing unit according to an embodiment of the present invention.

Referring to FIG. 3, a method of changing the cutoff frequencies of the high pass filter and the low pass filter is described. FIG. 3 is a circuit diagram of the shaking sensing unit 100 according to an embodiment of the present invention. Referring to FIG. 3, the shaking sensing unit 100 includes sensors 11 and 12, high pass filters 21a and 22a, and low pass filters 21b and 22b, respectively, with respect to the X axis and the Y axis. Each of the sensors 11 and 12 may be an angular velocity sensor. Although the angular sensor may be a gyro sensor, the present invention is not limited thereto.

In addition, the shaking sensing unit 100 may further include amplification units 31 and 32. The amplification units 31 and 32 may be included in a sensor unit 10 as illustrated in FIG. 3. Alternatively, the amplification units 31 and 32 may be arranged outside the sensor unit 10. In this case, the amplification units 31 and 32 are arranged at output ends of the high pass filters 21a and 22a and the low pass filters 21b and 22b and can amplify a signal output from the high pass filters 21a and 22a and the low pass filters 21b and 22b by an appropriate amplitude. Also, the amplification units 31 and 32 may be arranged between the sensor unit 10 and high pass filters 21a and 22a and amplifies the signal output from the sensor unit 10 by an appropriate amplitude to pass through the high pass filter 21a and 22a and the low pass filters 21b and 22b. The amplification units 31 and 32 may be reset by a signal inputted to an input node 57 of the sensor unit 10.

In another embodiment, the high pass filters 21a and 22a and the low pass filters 21b and 22b may be configured to be included in the sensor unit 10. The arrangement of the respective elements constituting the shaking sensing unit 100, that is, the sensors 11 and 12, the amplification units 31 and 32, the high pass filters 21a and 22a, and the low pass filters 21b and 22b, may be easily modified by those skilled in the art to which the present invention pertains. Thus, such modification is within the protection scope of the present invention.

The signals output from the sensors 11 and 12, that is, the signals at output nodes 54 and 51, respectively, of the sensor unit 10, are pulse signals consisting of direct current (DC) and alternating current (AC) components. Bias of the DC component is not constant and thus needs to be removed. The DC component is cut off by capacitors $C_{HPFX1}$ and $CH_{PFY1}$ of the high pass filters 21a and 22a. Thus, a DC power Vref for generating a bias signal is provided to bias the signal passing through the high pass filters 21a and 22a and the low pass filters 21b and 22b and apply the signals to input nodes (not shown) of the amplification units 31 and 32.

The DC power Vref may be arranged at an output side of the capacitors $C_{HPFX1}$ and $CH_{PFY1}$ of the high pass filters 21a and 22a as illustrated in FIG. 3. However, the present invention is not limited thereto and the DC power Vref may be arranged at any position provided a stable bias can be provided by being added to the AC signal having passed through the high pass filters 21a and 22a and the low pass filters 21b and 22b.

In the embodiment illustrated in FIG. 3, the shaking sensing unit 100 is configured such that the shaking signal output from the sensors 11 and 12 sequentially passes through the high pass filters 21a and 22a and the low pass filters 21b and 22b and then passes through the amplification units 31 and 32 included in the sensor unit 10.

The circuits of the high pass filters 21a and 22a and the low pass filters 21b and 22b illustrated in FIG. 3 may be applied to the first embodiment, that is, when a current shaking state is determined as a typical hand shaking case or shaking in a low frequency range. The following description is based on the Y axis.

The high pass filter 22a is an RC filter circuit. The high pass filter 22a includes a capacitor $C_{HPFY1}$, and two resistors $R_{HPFY1}$ and $R_{HPFY2}$. The capacitor $C_{HPFY1}$ is serially connected to the output node 51 of the sensor unit 10. The two resistors $R_{HPFY1}$ and $R_{HPFY1}$ are connected in parallel to each other and serially connected to the capacitor $C_{HPFY1}$. A switching device $TR_{HPFY1}$, for example, a transistor, is connected between the $R_{HPFY2}$ and the capacitor $C_{HPFY1}$. The emitter terminal of the switching device $TR_{HPFY1}$ is connected to the resistor $R_{HPFY2}$ and the collector terminal thereof is connected to the capacitor $C_{HPFY1}$. A switching control signal output from the shaking control unit 200 is input to the base terminal of the switching device $TR_{HPFY1}$.

In the first embodiment, the resistance of the resistor $R_{HPFY1}$ may be about 1 MΩ and the resistance of the resistor $R_{HPFY2}$ may be about 8 kΩ. The capacitance of the capacitor $C_{HPFY1}$ may be greater than 5 μF. The cutoff frequency of the high pass filter 22a consisting of the capacitor $C_{HPFY1}$ and the resistors $R_{HPFY1}$ and $R_{HPFY1}$ is $1/(2\pi RC)$, wherein RC is a time constant. That is, as the resistance or capacitance increases, the cutoff frequency of the high pass filter 22a decreases.

Figure 4A:
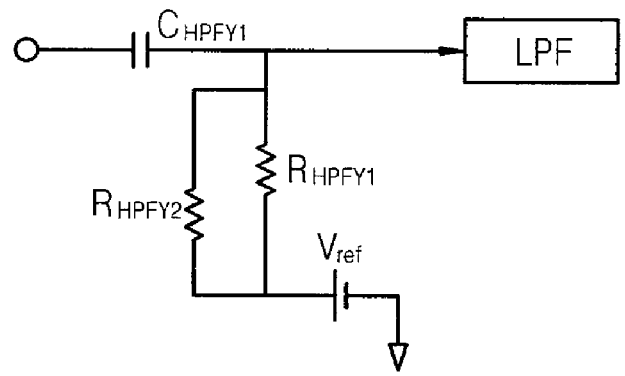
FIG. 4A is an equivalent circuit diagram of a high pass filter of the shaking sensing unit of FIG. 3 when a switching device of the high pass filter is ON, according to an embodiment of the present invention.
Figure 4B:
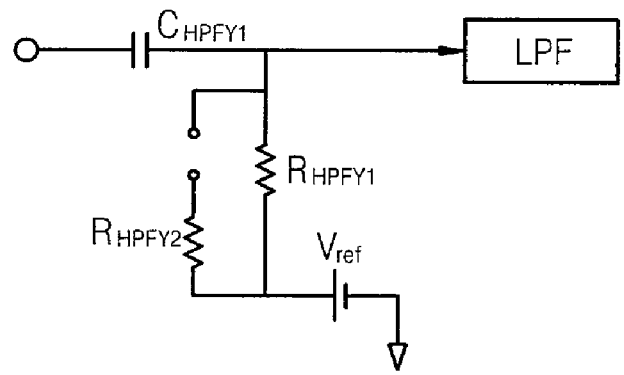
FIG. 4B is an equivalent circuit diagram of the high pass filter of FIG. 3 when the switching device of the high pass filter is OFF, according to an embodiment of the present invention.

FIG. 4A is an equivalent circuit diagram of the high pass filter 22a of the shaking sensing unit 100 of FIG. 3 when the switching device $TR_{HPFY1}$ is ON, according to an embodiment of the present invention. FIG. 4B is an equivalent circuit diagram of the high pass filter 22a of the shaking sensing unit 100 of FIG. 3 when the switching device $TR_{HPFY1}$ is OFF, according to an embodiment of the present invention. Referring to FIG. 4A, when a switching control signal applied to the switching device $TR_{HPFY1}$ is high, the switching device $TR_{HPFY1}$ is turned on, and thus the high pass filter 22a uses the resistors $R_{HPFY1}$ and $R_{HPFY1}$ connected in parallel to each other. Since the total equivalent resistance of the parallel resistors $R_{HPFY1}$ and $R_{HPFY1}$ is 7.9365 kΩ, the cutoff frequency of the high pass filter 22a is about 4 Hz. On the other hand, referring to FIG. 4B, when the switching control signal applied to the switching device $TR_{HPFY1}$ is low, the switching device $TR_{HPFY1}$ is turned off so that the high pass filter 22a uses the resistor $R_{HPFY1}$ only. Accordingly, since the total equivalent resistance is 1 MΩ, the cutoff frequency of the high pass filter 22a is about 0.03 Hz. In this embodiment, the resistance of the resistor $R_{HPFY1}$ must be greater than that of the resistor $R_{HPFY2}$. That is, the resistance of the resistor $R_{HPFY2}$ connected to the emitter terminal of the switching device $TR_{HPFY1}$ only needs to be less than that of the resistor $R_{HPFY1}$. However, the present invention is not limited to the above-described resistors and capacitors, and resistors and capacitors that can be easily modified and selected by those skilled in the art to which the present invention belongs may belong to the protection scope of the present invention.

When the cutoff frequency of the high pass filter 22a is set to about 0.03 Hz, a signal having a frequency of about 0.03 Hz or more can pass through the high pass filter 22a while a signal having a frequency lower than 0.03 Hz cannot pass through the high pass filter 22a.

Figure 8:
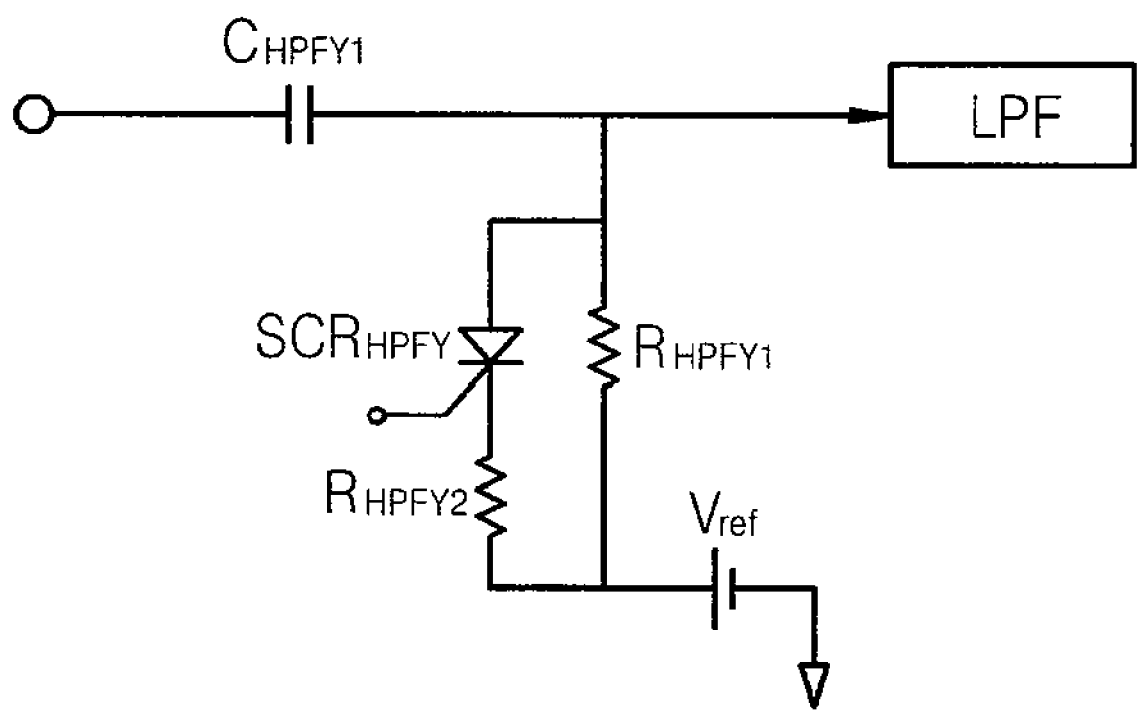
FIG. 8 is a circuit diagram of the switching device of the high pass filter of FIG. 3, according to an embodiment of the present invention.

In the present embodiment, although the switching device is an NPN type transistor, a PNP type transistor may be used instead. Also, the switching device may be a silicon controlled rectifier (SCR). FIG. 8 is a circuit diagram of a switching device SCR of the high pass filter 22a of FIG. 3, according to another embodiment of the present invention. When the silicon controlled rectifier $SCR_{HPFY}$ is used, as illustrated in FIG. 8, the capacitor $C_{HPFY1}$ is connected to the anode terminal of the silicon controlled rectifier $SCR_{HPFY}$, the resistor $R_{HPFY2}$ is connected to the cathode terminal of the silicon controlled rectifier $SCR_{HPFY}$, and the switching control signal is input to the gate terminal of the silicon controlled rectifier $SCR_{HPFY}$.

As described above, the cutoff frequency of the high pass filter 22a can be changed according to the switching control signal that is input to the switching device in the circuit of the high pass filter 22a. Accordingly, the initial shaking frequency correction range can be changed.

The principle of changing the cutoff frequency of the low pass filter 22b is the same as that of the changing the cutoff frequency of the high pass filter 22a. Referring to the low pass filter 22b illustrated in FIG. 3, two resistors $R_{LPFY1}$ and $R_{LPFY2}$ connected in parallel to each other are serially connected to a bypass capacitor $C_{LPFY1}$. The bypass capacitor $C_{LPFY1}$ is connected in parallel to a load and is grounded. A switching device $TR_{LPFY1}$, in this case a transistor, is connected to the resistor $R_{LPFY2}$ serially and to the resistor $R_{LPFY1}$ in parallel. Thus, an equivalent resistance of the low pass filter 22b may be the resistance of the resistor $R_{LPFY1}$ only or a combination of the resistor $R_{LPFY1}$ and the resistor $R_{LPFY2}$ according to the switching control signal input to the base terminal of the switching device $TR_{LPFY1}$.

The resistance of the resistor $R_{LPFY1}$ may be about 200 kΩ while the resistance of the resistor $R_{LPFY2}$ may be about 230 kΩ. The capacitance of the bypass capacitor $C_{LPFY1}$ may be about 0.1 μF. The cutoff frequency of the low pass filter 22b consisting of the bypass capacitance $C_{LPFY1}$ and the resistors $R_{LPFY1}$ and $R_{LPFY2}$ is $1/(2\pi RC)$. That is, as the resistance or capacitance increases, the cutoff frequency decreases.

When the switching control signal applied to the switching device $TR_{LPFY1}$ is high, the switching device $TR_{LPFY1}$ is turned on, and thus the low pass filter 22b uses a combination of the parallel resistors $R_{LPFY1}$ and $R_{LPFY2}$. Since the total equivalent resistance of the parallel resistors $R_{LPFY1}$ and $R_{LPFY2}$ is 106.977 kΩ, the cutoff frequency of the low pass filter 22b is about 15 Hz. On the other hand, when the switching control signal applied to the switching device $TR_{LPFY2}$ is low, the switching device $TR_{LPFY1}$ is turned off so that the low pass filter 22b uses the resistor $R_{LPFY1}$ only. Accordingly, since the equivalent resistance of the low pass filter 22b is the resistance of the resistor $R_{LPFY1}$ only, that is, 200 kΩ, the cutoff frequency of the low pass filter 22b is about 8 Hz.

When the cutoff frequency of the low pass filter 22b is set to about 15 Hz, since the reactance of the bypass capacitor $C_{LPFY1}$ is very high with respect to signals having a frequency of about 15 Hz or less, the number of signals passing through the bypass capacitor $C_{LPFY1}$ is very low, and thus signals pass through the load. On the other hand, for signals having a frequency higher than 15 Hz, since the reactance of the bypass capacitor $C_{LPFY1}$ is very low, most signals are bypassed toward the bypass capacitor $C_{LPFY1}$ so that the signals cannot pass through the load.

In the first embodiment, when a low signal is applied to the base terminal of the switching device $TR_{HPFY1}$ of the high pass filter 22a, the switching device $TR_{HPFY1}$ is turned off and the high pass filter 22a uses the resistor $R_{HPFY1}$ only so that the cutoff frequency is set to about 0.03 Hz. When a high signal is applied to the base terminal of the switching device $TR_{LPFY1}$ of the low pass filter 22b, the switching device $TR_{LPFY1}$ is turned on and the low pass filter 22b uses both of the resistors $R_{LPFY1}$ and $R_{LPFY2}$ so that the cutoff frequency is set to about 15 Hz. Then, when the shaking is determined to be the typical hand shaking, the switching device $TR_{HPFY1}$ of the high pass filter 22a is turned on and the switching device $TR_{LPFY1}$ of the low pass filter 22b is maintained to be turned on. Accordingly, the shaking correction frequency range is reset to about 4-15 Hz. When the shaking is determined to be shaking in a low frequency range, the switching device $TR_{HPFY1}$ of the high pass filter 22a and the switching device $TR_{LPFY1}$ of the low pass filter 22b are turned off. Accordingly, the shaking correction frequency range is reset to about 0.03-15 Hz.

The shaking signal passing through the high pass filter 22a and the low pass filter 22b whose cutoff frequencies are reset is input to the amplification unit 32 via an amplification unit input node 52 of the sensor unit 10. The signal amplified by a predetermined multiple by the amplification unit 32 is input to the shaking control unit 200 via an amplification unit output node 53. Then, the shaking control unit 200 determines the amount of shaking correction in the reset shaking correction frequency range and drives the shaking correction unit 300 to perform the shaking correction.

In the first embodiment, for the shaking in a low frequency range that is outside the typical hand shaking correction range, the shaking correction is performed after changing the shaking frequency correction range to a corresponding appropriate shaking frequency correction range using the above-described method. Thus, accurate correction can be performed in a shaking environment having a low frequency that is deviated from the typical hand shaking correction range.

FIG. 5 is a circuit diagram of a the shaking sensing unit 100 of FIG. 3, according to another embodiment of the present invention. The difference between the embodiment of FIG. 5 and that of FIG. 3 lies in that the order of the high pass filter 22a and the low pass filter 22b are switched. That is, in the embodiment of FIG. 5, the signal output from the sensor first passes through the low pass filter 22b and then the high pass filter 22a. Thus, after signals having a high frequency are removed by the low pass filter 22b, signals having a low frequency are removed by the high pass filter 22.

Figure 6A:
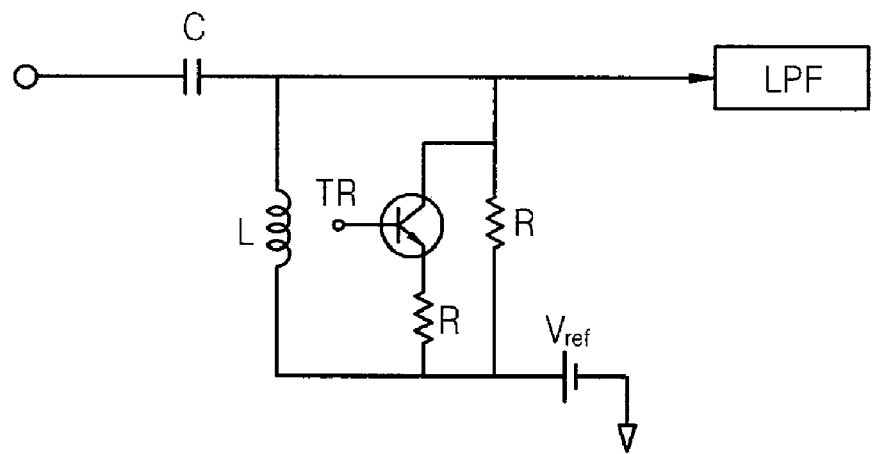
FIGS. 6A to 6C are circuit diagrams of the high pass filter of FIG. 3, according to other embodiments of the present invention.
Figure 6B:
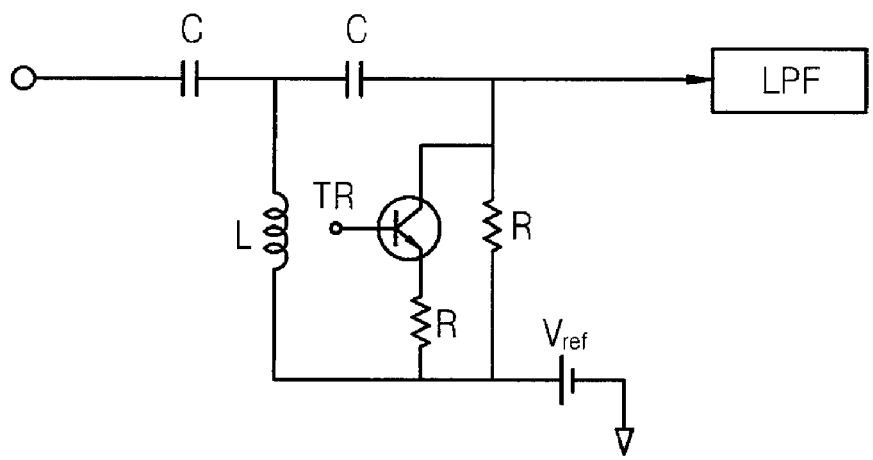
Figure 6C:
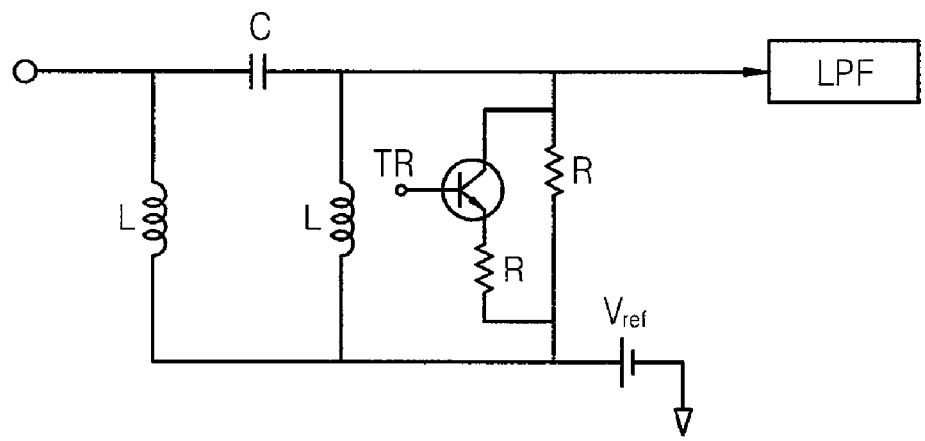

FIGS. 6A-6C are circuit diagrams of the high pass filter 22a of FIG. 3, according to other embodiments of the present invention. The high pass filters illustrated in FIGS. 6A-6C can be applied to the above-described first embodiment.

The circuits of the high pass filter 22a and the low pass filter 22b illustrated in FIG. 3 can be applied to the above-described first embodiment. First, compared to the high pass filter 22a illustrated in FIG. 3, the high pass filter illustrated in FIG. 6A is serially connected to a capacitor C and additionally uses an inductor L that is connected to a combination of resistors R in parallel. The reactance of the inductor L increases as the frequency of a signal increases. Accordingly, a signal having a high frequency is not allowed to pass through the high pass filter of FIG. 6A due to a large reactance while a signal having a low frequency is not allowed to pass due to a small reactance which forms an almost short circuit. In the present embodiment, the inductance of the inductor L must be set such that reactance $X_L$ of the inductor L is not less than the equivalent resistance of the parallel resistors R.

The high pass filter illustrated in FIG. 6B uses an additional capacitor C, compared to the high pass filter illustrated in FIG. 6A. The high pass filter illustrated in FIG. 6C uses an additional capacitor C, compared to the high pass filter illustrated in FIG. 6A. The high pass filters illustrated in FIG. 6A-6C can perform almost the same function as that of the high pass filter 22a of FIG. 3, and are suggested merely to show modified embodiments of the high pass filter 22a of FIG. 3 while using the technical concept of the present invention. Those skilled in the art to which the present invention pertains can easily and variously modify the arrangement of passive devices such as resistors, capacitors, and inductors used in the modified embodiments and the resistance, capacitance, and inductance thereof, respectively. Thus, embodiments that can be easily modified by those skilled in the art by using the technical concept of the present invention are within the protection scope of the present invention.

FIGS. 7A-7E are circuit diagrams of the low pass filter 22b of FIG. 3, according to other embodiments of the present invention. The low pass filters illustrated in FIG. 3 can be applied to the above-described first embodiment. Compared to the low pass filter 22b of FIG. 3, the low pass filter illustrated in FIG. 7A further includes a load resistor $R_L$ connected to a bypass capacitor C in parallel. Switching device TR is serially connected to one of two resistors R connected in parallel. The equivalent resistance of the load resistor $R_L$ and the other resistor R varies according to a control signal input to the switching device TR. Accordingly, the equivalent resistance of the low pass filter is changed. Thus, the cutoff frequency of the low pass filter can be adjusted.

Figure 7A:
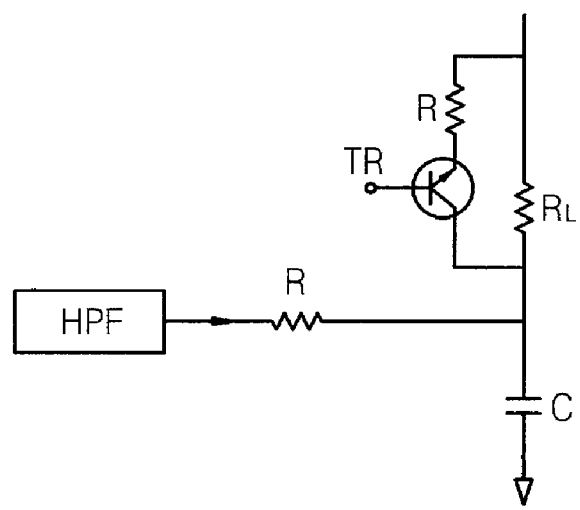
FIGS. 7A to 7E are circuit diagrams of a low pass filter of FIG. 3, according to embodiments of the present invention.
Figure 7B:
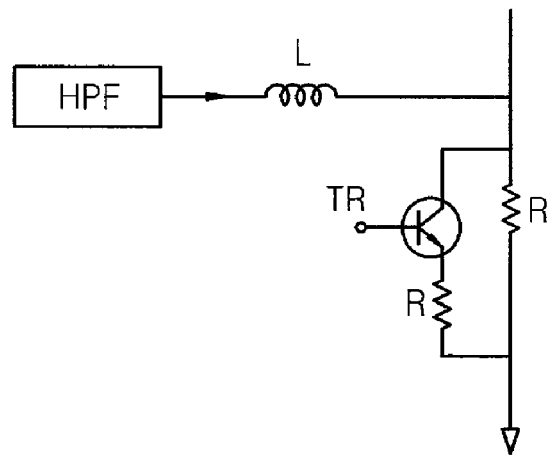

The low pass filter illustrated in FIG. 7B includes an inductor L and resistors R. The resistors R are connected to each other in parallel. The inductor L is serially connected to the resistors R. Since a very large reactance is generated in the inductor L for a signal having a frequency higher than the cutoff frequency, such a signal cannot pass through the inductor L. On the other hand, since a very small reactance is generated in the inductor L for a signal having a frequency lower than the cutoff frequency, such a signal can pass through the inductor L. In this case, the equivalent resistance of the load resistors R and $R_L$ is changed according to the control signal input to the switching device TR. Accordingly, the equivalent resistance of the low pass filter is changed. Thus, the cutoff frequency of the low pass filter can be adjusted.

Figure 7C:
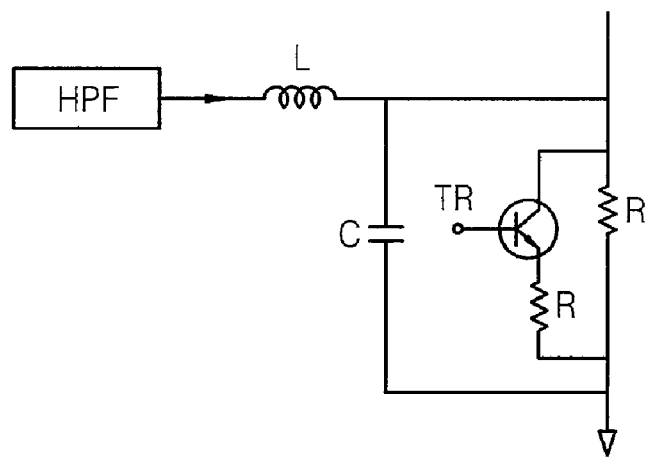
Figure 7D:
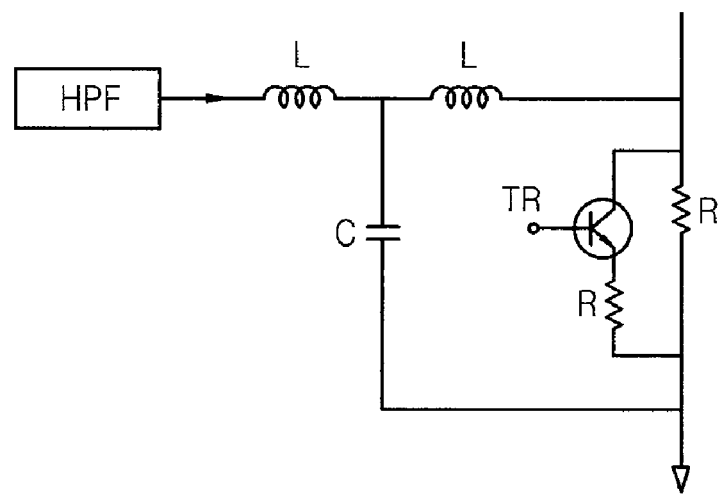
Figure 7E:
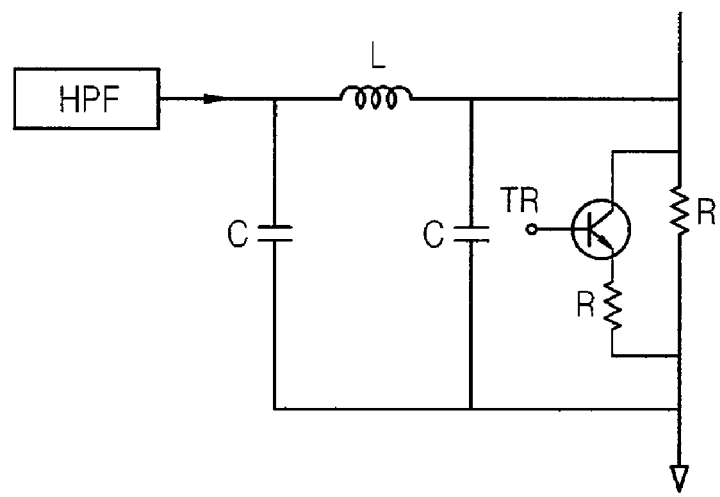

The low pass filter of FIG. 7C additionally includes a capacitor C, compared to the low pass filter of FIG. 7B. The low pass filter of FIG. 7D additionally includes an inductor L, compared to the low pass filter of FIG. 7C. The low pass filter of FIG. 7E additionally includes a capacitor C, compared to the low pass filter of FIG. 7C.

The low pass filters illustrated in FIGS. 7A-7E can perform almost the same function as that of the low pass filter 22b of FIG. 3, and are suggested merely to show modified embodiments of the low pass filter 22b of FIG. 3 while using the technical concept of the present invention. Those skilled in the art to which the present invention pertains can easily and variously modify the arrangement of passive devices such as resistors, capacitors, and inductors used in the modified embodiments and the resistance, capacitance, and inductance thereof, respectively. Thus, embodiments that can be easily modified by those skilled in the art by using the technical concept of the present invention are within the protection scope of the present invention.

Figure 9:
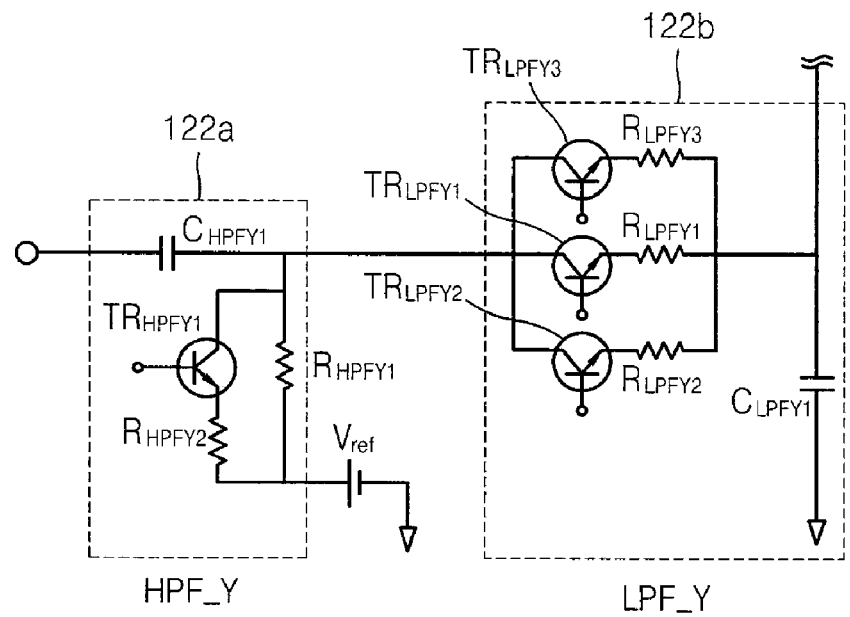
FIG. 9 is a circuit diagram of a high pass filter and a low pass filter of a shaking sensing unit according to another embodiment of the present invention.

FIG. 9 is a circuit diagram of a high pass filter 122a and a low pass filter 122b of a shaking sensing unit according to another embodiment of the present invention. Although the high pass filter 122a illustrated in FIG. 9 has the same circuit as the high pass filter 22a in FIG. 3, the resistances of the two circuits are different. However, the low pass filter 122b of FIG. 9 is different from the low pass filter 122b of FIG. 3 in that the low pass filter 122b of FIG. 9 has three resistors $R_{LPFY1}$, $R_{LPFY2}$, and $R_{LPFY3}$ connected in parallel with each other and switching devices $TR_{LPFY1}$, $TR_{LPFY2}$, and $TR_{LPFY3}$ are connected in series to the resistors $R_{LPFY1}$, $R_{LPFY2}$, and $R_{LPFY3}$, respectively. In the present embodiment, in the high pass filter 122a, the resistance of the resistor $R_{HPFY1}$ is about 8 kΩ, the resistance of the resistor $R_{HPFY1}$ is about 8 kΩ, and the capacitance of the capacitor $C_{HPFY1}$ is about 5 μF. In the low pass filter 122b of FIG. 9, the resistor $R_{LPFY1}$ is about 110 kΩ, the resistor $R_{LPFY2}$ is about 790 kΩ, and the capacitor $C_{LPFY1}$ is about 0.1 μF.

In the present embodiment, the initial shaking correction frequency range may be set to about 4 Hz-2 kHz. To this end, a low signal is applied to the base terminal of the switching device $TR_{HPFY1}$ of the high pass filter 122a, low signals are applied to the base terminals of the switching devices $TR_{LPFY1}$ and $TR_{LPFY2}$ of the low pass filter 122b, and a high signal is applied to the base terminal of the switching device $TR_{LPFY3}$ of the low pass filter 122b. Then, in the high pass filter 122a, since the switching device $TR_{HPFY1}$ is turned off and only the resistor $R_{HPFY1}$ is used, the cutoff frequency is set to about 4 Hz. In the low pass filter 122b, only the switching device $TR_{LPFY3}$ is turned on, and thus the cutoff frequency is set to about 2 kHz.

When the shaking is determined to be the typical hand shaking, the shaking correction frequency range may be set to about 4-15 Hz. To this end, a low signal is still applied to the base terminal of the switching device $TR_{HPFY1}$ of the high pass filter 122a, low signals are applied to the base terminals of the switching devices $TR_{LPFY2}$ and $TR_{LPFY3}$ of the low pass filter 122b, and a high signal is applied to the base terminal of the switching device $TR_{LPFY1}$ of the low pass filter 122b.

Then, in the high pass filter 122a, since the switching device $TR_{HPFY1}$ is turned off and only the resistor $R_{HPFY1}$ is used, the cutoff frequency is set to about 4 Hz. In the low pass filter 122b, only the switching device $TR_{LPFY1}$ is turned on, and thus the cutoff frequency is set to about 15 Hz.

On the other hand, when the shaking is determined to be shaking in a high frequency range, the shaking correction frequency range may be set to about 8-20 Hz. To this end, a low signal is applied to the base terminal of the switching device $TR_{HPFY1}$ of the high pass filter 122a, low signals are applied to the base terminals of the switching devices $TR_{LPFY1}$ and $TR_{LPFY3}$ of the low pass filter 122b, and a high signal is applied to the base terminal of the switching device $TR_{LPFY2}$ of the low pass filter 122b. Then, in the high pass filter 122a, since the switching device $TR_{HPFY1}$ is turned off and both of the resistors $R_{HPFY1}$ and $R_{HPFY2}$ are used, the cutoff frequency is set to about 8 Hz. In the low pass filter 122b, only the switching device $TR_{LPFY2}$ is turned on, and thus the cutoff frequency is set to about 20 Hz.

In the present embodiment, shaking correction is performed even for the shaking in a low frequency range outside the typical hand shaking correction range by changing the shaking correction frequency range to a corresponding appropriate shaking frequency correction range.

Figure 10:
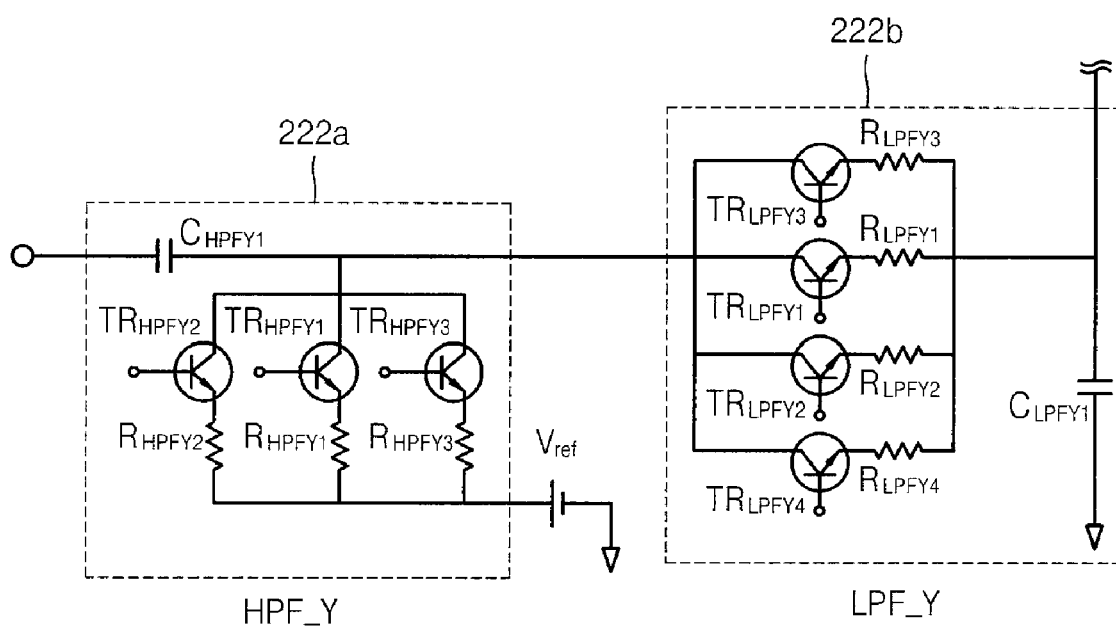
FIG. 10 is a circuit diagram of a high pass filter and a low pass filter of a shaking sensing unit according to another embodiment of the present invention.

FIG. 10 is a circuit diagram of a high pass filter 222a and a low pass filter 222b of a shaking sensing unit according to another embodiment of the present invention. Referring to FIG. 10, the high pass filter 222a includes three resistors $R_{HPFY1}$, $R_{HPFY2}$, and $R_{HPFY3}$ connected to each other in parallel, and is different from the high pass filter 22a of FIG. 3 in that switching devices $TR_{HPFY1}$, $TR_{HPFY2}$, and $TR_{HPFY3}$ are connected in series to the resistors $R_{HPFY1}$, $R_{HPFY2}$, and $R_{HPFY3}$, respectively. In the present embodiment, the low pass filter 222b includes four resistors $R_{LPFY1}$, $R_{LPFY2}$, $R_{LPFY3}$, and $R_{LPFY4}$ connected to each in parallel and is different from the low pass filter 22b of FIG. 3 in that switching devices $TR_{LPFY1}$, $TR_{LPFY2}$, $TR_{LPFY3}$, and $TR_{LPFY4}$ are connected in series to the resistors $R_{LPFY1}$, $R_{LPFY2}$, $R_{LPFY3}$, and $R_{LPFY4}$, respectively. In the high pass filter 222a of the present embodiment, the resistance of the resistor $R_{HPFY1}$ is about 1 MΩ, the resistance of the resistor $R_{HPFY2}$ is about 8 kΩ, the resistance of the resistor $R_{HPFY3}$ is about 4 kΩ, and the capacitance of the capacitor $C_{HPFY1}$ is about 5 μF. In the low pass filter 222b of the present embodiment, the resistance of the resistor $R_{LPFY1}$ is about 200 kΩ, the resistance of the resistor $R_{LPFY2}$ is about 110 kΩ, the resistance of the resistor $R_{LPFY3}$ is about 80 kΩ, the resistance of the resistor $R_{LPFY4}$ is about 790Ω, and the capacitance of the capacitor $C_{LPFY1}$ is about 0.1 μF.

In the present embodiment, the initial shaking correction frequency range may be set to about 0.03 Hz-2 kHz. To this end, in the high pass filter 222a, a high signal is applied to the base terminal of the switching device $TR_{HPFY1}$ and low signals are applied to the base terminals of the switching devices $TR_{HPFY1}$ and $TR_{HPFY2}$. In the low pass filter 222b, low signals are applied to the base terminals of the switching devices $TR_{LPFY1}$, $TR_{LPFY2}$, and $TR_{LPFY3}$ and a high signal is applied to the base terminal of the switching device $TR_{HPFY4}$. Then, in the high pass filter 222a, since only the switching device $TR_{HPFY1}$ is turned on and only the resistor $R_{HPFY1}$ is used, the cutoff frequency is set to about 0.03 Hz. In the low pass filter 222b, only the switching device $TR_{LPFY4}$ is turned on, and thus the cutoff frequency is set to about 2 kHz.

When the shaking is determined to be the typical hand shaking, the shaking correction frequency range may be set to about 4-15 Hz. To this end, only the switching device $TR_{HPFY2}$ of the high pass filter 222a and the switching device $TR_{LPFY2}$ of the low pass filter 222b are turned on. Then, in the high pass filter 222a, since only the resistor $R_{HPFY2}$ is connected, the cutoff frequency is set to about 4 Hz. In the low pass filter 222b, since only the resistor $R_{LPFY2}$ is connected, the cutoff frequency is set to about 15 Hz.

On the other hand, when the shaking is determined to be shaking in a low frequency range, the shaking correction frequency range may be set to about 0.03-8 Hz. To this end, only the switching device $TR_{HPFY1}$ of the high pass filter 222a and the switching device $TR_{LPFY1}$ of the low pass filter 222b are turned on. Then, in the high pass filter 222a, since only the resistor $R_{HPFY1}$ is connected, the cutoff frequency is set to about 0.03 Hz. In the low pass filter 222b, since only the switching device $TR_{LPFY1}$ is connected, the cutoff frequency is set to about 8 Hz.

When the shaking is determined to be shaking in a high frequency range, the shaking correction frequency range may be set to about 8-20 Hz. To this end, only the switching device $TR_{HPFY3}$ of the high pass filter 222a and the switching device $R_{LPFY53}$ of the low pass filter 222b are turned on. Then, in the high pass filter 222a, since only the resistor $R_{HPFY3}$ is connected, the cutoff frequency is set to about 8 Hz. In the low pass filter 222b, since only the resistor $R_{LPFY3}$ is connected, the cutoff frequency is set to about 20 Hz.

In the present embodiment, shaking correction is performed even for shaking in a low or high frequency range that is outside the typical hand shaking correction range by changing the shaking correction frequency range to a corresponding appropriate shaking frequency correction range. Thus, accurate correction can be performed in a shaking environment having a low or high frequency range that is outside the typical hand shaking correction range.

The method of resetting the cutoff frequency of a high pass filter and a low pass filter can be performed not only by controlling the above-described switching devices in each filter circuit but also by software such as a digital filter according to a processing unit like a central processing unit (CPU). Such a method is within the protection scope of the present invention.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A shaking sensing unit comprising:
   at least one sensor for sensing a rotation about at least one axis and supplying a sensor signal;
   a high pass filter that passes a signal having a frequency not less than a cutoff frequency of the high pass filter; and
   a low pass filter that passes a signal having a frequency not greater than a cutoff frequency of the low pass filter and higher than the cutoff frequency of the high pass filter,
   wherein the sensor signal is supplied to a circuit that comprises both the high pass filter and the low pass filter and the cutoff frequency of the high pass filter and the cutoff frequency of the low pass filter are variably determined according to a shaking frequency.

2. The shaking sensing unit of claim 1, wherein the high pass filter comprises:
   at least one capacitor;
   at least two resistors connected in parallel to each other and connected to the at least one capacitor to pass only a signal having a frequency not less than the cutoff frequency of the high pass filter; and at least one switching device serially connected to at least one of the at least two resistors,
wherein the switching device connects or disconnects a circuit line of the resistor serially connected to the at least one switching device according to a switching control signal, thereby controlling the overall equivalent resistance of the at least two resistors.

3. The shaking sensing unit of claim 2, wherein the high pass filter further comprises at least one inductor connected to the at least one capacitor and the at least two resistors to pass only a signal having a frequency not less than the cutoff frequency of the high pass filter.

4. The shaking sensing unit of claim 1, wherein the low pass filter comprises:
at least one capacitor;
at least two resistors connected in parallel to each other and connected to the least one capacitor to pass only a signal having a frequency not greater than the cutoff frequency of the low pass filter; and
at least one switching device serially connected to at least one of the at least two resistors,
wherein the at least one switching device connects or disconnects a circuit line of the resistor serially connected to the at least one switching device according to a switching control signal, thereby controlling the overall equivalent resistance of the at least two resistors.

5. The shaking sensing unit of claim 1, wherein the low pass filter comprises:
at least one inductor;
at least two resistors connected in parallel to each other and connected to the least one inductor to pass only a signal having a frequency not greater than the cutoff frequency of the low pass filter; and
at least one switching device serially connected to at least one of the at least two resistors,
wherein the at least one switching device connects or disconnects a circuit line of the resistor serially connected to the at least one switching device according to a switching control signal, thereby controlling the overall equivalent resistance of the at least two resistors.

6. The shaking sensing unit of claim 5, wherein the low pass filter further comprises at least one capacitor connected to the at least one inductor and the at least two resistors to pass only a signal having a frequency not greater than the cutoff frequency of the low pass filter.

7. The shaking sensing unit of claim 2, wherein the at least one switching device comprises a transistor and a circuit line of the resistor serially connected to the at least one switching device is connected or disconnected according to a switching control signal input to a base terminal of the transistor.

8. The shaking sensing unit of claim 2, wherein the at least one switching device comprises a silicon controlled rectifier (SCR) and a circuit line of the resistor serially connected to the at least one switching device is connected or disconnected according to a switching control signal input to a gate terminal of the silicon controlled rectifier.

9. The shaking sensing unit of claim 1, further comprising an amplification unit which receives an electrical signal output from the high pass filter and the low pass filter and generates an amplified electrical signal.

10. The shaking sensing unit of claim 9, further comprising a DC power source which is connected to the high pass filter or the low pass filter and supplies a bias signal to an electrical signal input to the amplification unit.

11. The shaking sensing unit of claim 1, wherein the at least one sensor comprises two sensors for sensing rotation about two substantially orthogonal axes of rotation.

12. An apparatus for correcting shaking, the apparatus comprising:
at least one sensor for sensing a rotation about at least one axis and supplying a sensor signal;
a filter circuit for receiving the sensor signal, the filter circuit comprising:
a high pass filter that passes a signal having a frequency not less than a cutoff frequency of the high pass filter; and
a low pass filter that passes a signal having a frequency not greater than a cutoff frequency of the low pass filter and higher than the cutoff frequency of the high pass filter;
a shaking control unit for receiving a shaking signal output from the filter circuit, determining a cutoff frequency range of correction of shaking for both the high pass filter and the low pass filter, calculating an amount of correction of shaking, and outputting a driving signal, and
a shaking correcting unit being driven according to the driving signal.

13. A method of correcting shaking, the method comprising:
determining a shaking correction frequency range by processing an electrical signal output from a sensor sensing a rotation about at least one axis;
resetting a cutoff frequency of each of a high pass filter and a low pass filter connected to a rear portion of an output node of the sensor to correspond to the determined shaking correction frequency range;
allowing the electrical signal output from the sensor to pass through the high pass filter having the reset cutoff frequency and the low pass filter having the reset cutoff frequency; and
determining an amount of correction of shaking in at least one axis using the electrical signals output from the high pass filter and the low pass filter.

14. The method of claim 13, further comprising inputting the electrical signals output from the high pass filter and the low pass filter to an amplification unit, wherein, in the determining of an amount of correction of shaking, the amount of correction of shaking in the at least one axis is determined using the electrical signal output from the amplification unit.

15. The method of claim 13, wherein the determining of a shaking correction frequency range comprises:
setting an initial cutoff frequency of the high pass filter to be lower than a preset reference cutoff frequency of the high pass filter for a preset typical hand shaking case; and
determining whether the percentage of signals having a frequency that is lower than the reference cutoff frequency at an output node of the high pass filter among a plurality of signals output from the sensor, is not less than a reference threshold,
wherein, if the percentage of signals having a frequency that is lower than the reference cutoff frequency at the output node of the high pass filter among a plurality of signals output from the sensor, is determined to be not less than a reference threshold, the shaking correction frequency range is reset to a low frequency shaking correction frequency range that is lower than the shaking correction frequency range for the typical hand shaking case, and if the percentage of signals having a frequency that is lower than the reference cutoff frequency at the output node of the high pass filter among the signals output from the sensor, is determined to be not greater than the reference threshold, the shaking correction frequency range is reset to the shaking correction frequency range for the typical hand shaking case.

16. The method of claim 13, wherein the determining of a shaking correction frequency range comprises:
setting an initial cutoff frequency of the low pass filter to be higher than a reference cutoff frequency of the low pass filter for a preset typical hand shaking case; and
determining whether the percentage of signals having a frequency that is higher than the reference cutoff frequency at an output node of the low pass filter among a plurality of signals output from the sensor, is not less than a reference threshold,
wherein, if the percentage of signals having a frequency that is higher than the reference cutoff frequency at the output node of the low pass filter among a plurality of signals output from the sensor, is determined to be not less than a reference threshold, the shaking correction frequency range is reset to a high frequency shaking correction frequency range that is higher than the shaking correction frequency range for the typical hand shaking case, and if the percentage of signals having a frequency that exceeds the reference cutoff frequency at the output node of the low pass filter among the signals output from the sensor, is determined to be not greater than the reference threshold, the shaking correction frequency range is reset to the shaking correction frequency range for the typical hand shaking case.

17. The method of either claim 16, wherein the shaking correction frequency range for the typical hand shaking case is about 4-15 Hz, the low frequency shaking correction frequency range is about 0.01-8 Hz, and the high frequency shaking correction frequency range is about 8-20 Hz.

18. The method of claim 13, wherein, in the resetting of the cutoff frequency of each of the high pass filter and the low pass filter, a lower limit of the set shaking correction frequency range is set as the cutoff frequency of the high pass filter and an upper limit of the set shaking correction frequency range is set as the cutoff frequency of the low pass filter.

19. The method of claim 13, wherein, in the resetting of the cutoff frequency of each of the high pass filter and the low pass filter, the cut off frequencies in each of the high pass filter and the low pass filter is reset by using a switching device of each of the high pass filter and the low pass filter and adjusting the overall equivalent resistance of at least two resistors in each of the high pass filter and the low pass filter.

20. The method of claim 13, wherein the at least one axis comprises two substantially orthogonal axes and the steps of the method are performed for each of the two substantially orthogonal axes.

* * * * *